United States Patent
Muthukrishnan et al.

(10) Patent No.: US 12,013,787 B2
(45) Date of Patent: Jun. 18, 2024

(54) DUAL PERSONALITY MEMORY FOR AUTONOMOUS MULTI-TENANT CLOUD ENVIRONMENT

(71) Applicant: Oracle International Corporation, Redwood Shores, CA (US)

(72) Inventors: Nagarajan Muthukrishnan, San Ramon, CA (US); William Henry Benjamin Habeck, Eagle, ID (US); Roshni Chatterjee, Fremont, CA (US); Sue-Kyoung Lee, Emerald Hills, CA (US); Ravi Shankar Thammaiah, Redwood Shores, CA (US); Sumanta Chatterjee, Menlo Park, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/962,401

(22) Filed: Oct. 7, 2022

(65) Prior Publication Data
US 2024/0119006 A1  Apr. 11, 2024

(51) Int. Cl.
*G06F 12/0882* (2016.01)
*G06F 12/084* (2016.01)

(52) U.S. Cl.
CPC ........ *G06F 12/0882* (2013.01); *G06F 12/084* (2013.01)

(58) Field of Classification Search
CPC ............................ G06F 12/0882; G06F 12/084
See application file for complete search history.

(56) References Cited

U.S. PATENT DOCUMENTS

| | | | | |
|---|---|---|---|---|
| 6,061,773 A | * | 5/2000 | Harvey | ............... G06F 12/0882 711/209 |
| 2011/0289263 A1 | * | 11/2011 | McWilliams | ....... G06F 12/0802 711/E12.008 |

(Continued)

OTHER PUBLICATIONS

Oracle Help Center, "Tuning the System Global Area", Database Performance Tuning Guide, Oracle Database Online Documentation 12c Release 1 (12.1), https://docs.oracle.com/database/121/nav/portal_4.htm, copyright 2017, 9pgs.

(Continued)

*Primary Examiner* — Jason W Blust
(74) *Attorney, Agent, or Firm* — Hickman Becker Bingham Ledesma LLP (57) ABSTRACT

A computing device is configured to allocate memory for exclusive use of an execution entity from both a shared memory area and a private memory area of the device. Specifically, the shared memory area is configured with a united memory pool (UMP) component. The UMP component is configured to provide portions of huge page-based memory to execution entities for exclusive use of the execution entities. Memory granules that are allocated to the UMP component are divided into smaller memory chunks (which are smaller than a huge page), each of which can be allocated for exclusive use of an execution entity. These memory chunks are mapped to virtual address spaces of the assigned execution entities. Because memory granules can be allocated to, and deallocated from, the UMP component at run-time, the amount of memory that is available for private data generated by execution entities is able to be dynamically adjusted.

12 Claims, 6 Drawing Sheets

(56) References Cited

U.S. PATENT DOCUMENTS

2019/0065267 A1* 2/2019 Van Riel ............. G06F 12/0882
2019/0107965 A1* 4/2019 Deval ................... G06F 3/0659
2021/0132999 A1* 5/2021 Haywood ............... G06F 9/544

OTHER PUBLICATIONS

Oracle Database, "Managing Memory", Database Administrator's Guide, https://docs.oracle.com/en/database/oracle/oracle-database/12.2/admin/managing-memory.html#GUID-BEABE53D-8058-4834-B99B-5C80A8AD5B06, May 23, 2022, 36pgs.

* cited by examiner

DUAL PERSONALITY MEMORY FOR AUTONOMOUS MULTI-TENANT CLOUD ENVIRONMENT

FIELD OF THE INVENTION

The present invention relates to computing device memory management, and more specifically, to run-time allocation of huge memory pages for execution entities to store private data.

BACKGROUND

Many computing devices run multiple execution entities—such as processes and/or threads—that perform related tasks. Such execution entities can produce information that may be useful to other execution entities (shareable data) and/or information that is specific to the task being performed by the execution entity (private data). Computer memory (such as DRAM) can be allocated to accommodate both shareable data and private data, e.g., by allocating (a) a first portion of memory as a private memory area, where the data stored in the private memory area is not available to any execution entities other than the owner execution entity, and (b) a second portion of memory as a shared memory area, where the data stored thereon is available to multiple execution entities jointly.

The optimal amount of memory in a shared memory area on a given system depends on the tasks being performed by system execution entities. If the amount of shared memory allocated on a computing device is not optimal for the tasks being performed by system execution entities, the efficiency of the computing system can be greatly diminished. For example, a computing device that runs a database management system generally supports multiple execution entities performing tasks for database querying and management. Different types of database workloads benefit from different amounts of shared memory. For example, online transaction processing (OLTP)-type database workloads benefit from large amounts of shared memory, and require relatively small amounts of private memory. In contrast, complex data warehousing-type workloads running complex queries benefit from large amounts of private memory and require relatively small amounts of shared memory. To complicate the determination of an optimal allocation of shared memory, the type of a database workload can change over time. Furthermore, computing devices running multi-tenant database management systems are required to manage multiple (potentially changing) database workloads that may be of different types with different memory requirements at different times.

Once a system has booted up, it is difficult to change the amount of shared memory that has been allocated on a computing device. Device memory is managed in sections called "pages". Computing devices track the addresses being used to refer to memory pages in various ways, including using a translation lookaside buffer (TLB), which is a fast hardware cache that stores some of the virtual-to-physical page mappings for the computing system. Because the TLB holds a limited number of virtual-to-physical page mappings, the technique of increasing page sizes can reduce the overall number of virtual-to-physical page mappings for the computing system and increase the chance that a required mapping will be stored in the TLB. Shared memory is allocated from a pool of "huge" pages (usually sized from 2 megabytes (MB) to 1 gigabyte (GB)), in contrast with "standard" pages that are generally used for the private memory area (usually 4 kilobytes (KB) in size). It would be inefficient to allocate huge pages to execution entities requiring private memory space given that execution entities generally do not store 2 MB-1 GB of data in private memory, and the unused space in any huge page allocated for the private memory area would be wasted.

Traditionally, shared memory is allocated at boot time and cannot be reconfigured without rebooting the device. In such cases, any changes to memory allocation require manual reconfiguration and rebooting of the system, thus leading to device downtime. This rigidity of memory is disadvantageous for many applications, such as autonomous multi-tenant cloud environments where tenants and their memory preferences are continually changing.

Some memory management techniques manage the amount of memory allocated for the shared and private memory areas within a computing device by requesting the operating system (OS) of the device to allocate the required huge pages for the shared memory area or to allocate the required standard pages for the private memory area. The OS can be configured to perform merge and split operations on memory pages to produce the needed huge or standard page sizes. However, such operations incur undesirable processing overhead.

Furthermore, in order to convert a huge page into standard pages, the huge page first must be released to the OS. However, all execution entities that have access to the shared memory area maintain mapping data that maps to the shared memory pages. Thus, releasing a huge page from the shared memory area (or adding a huge page to the shared memory area) requires adjusting the shared memory mappings maintained by the execution entities, which is expensive. Also, releasing a page to the OS while it is in use by any execution entity can cause errors, but it can be difficult to determine whether any portion of the page is currently in use by any execution entity.

Additionally, some memory management solutions can cause isolation issues for systems that require data isolation between execution entities, and/or fairness issues for systems that require multiple parties to share resources. In a multi-tenant environment, fairness means having memory availability and limits that are commensurate with tenants paid-for processing power. For example, a multi-tenant database system requires isolation between execution entities implementing tasks for the various tenants and requires fairness in allocating resources among the execution entities of the tenants (e.g., pursuant to service level agreements). However, some memory models maintain a common shared memory area for multiple database tenants and having the shared area affects isolation, accounting, and management. Isolation is not possible because the execution entities are using the same address space and have objects in very close proximity. Memory corruption in one object may affect a neighboring object. Accounting performance is affected because every small use of the common area will cause a statistics update and a possible limit check. Management of the common area is difficult because the tenant memory is interspersed and a single tenant freeing its usage will most likely not create contiguous free memory blocks that could be moved to another pool. As such, it would be advantageous to manage private and shared memory requirements in a flexible manner, at run-time, and in a way that provides isolation and fairness for systems that implement tasks for multiple parties.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the described techniques. It will be apparent, however, that the described techniques may be practiced without these specific details. In other instances, well-known structures and devices are shown in block diagram form in order to avoid unnecessarily obscuring the described techniques.

1. General Overview

Techniques described herein provide a run-time adjustable memory model, where memory can automatically be utilized in either of a shared memory area and a private memory area without requiring device reboot.

Accordingly, a computing device is configured to allocate memory for exclusive use of an execution entity (i.e., to store private data) from both a shared memory area and a private memory area of the device. A portion of memory is allocated for exclusive use of an execution entity when the execution entity is an application execution entity—implementing an application running on the computing device as opposed to system execution entities implementing an operating system of the computing device or implementing device drivers of the computing device, etc.—that has access to the portion of memory.

Specifically, the shared memory area of the device is configured with a united memory pool (UMP) shared memory structure, referred to herein as a shared memory "component". The UMP component is configured to provide portions of huge page-based memory to execution entities for exclusive use of the execution entities. Shared memory components in the shared memory area are able to exchange granules of memory (comprising huge pages) to allow the components to be dynamically sized according to the needs of the system.

Granules of memory that are allocated to the UMP component can be divided into smaller memory chunks (which are smaller than a huge page), each of which can be allocated for exclusive use of an execution entity. Because memory granules can be allocated to, and deallocated from, the UMP component at run-time, the amount of memory that is available for private data generated by execution entities is able to be dynamically adjusted without requiring the OS to convert huge pages into standard pages. In effect, the memory in the UMP component can have dual personas, that is, can be shared memory or private memory.

Each memory granule in the UMP component can be assigned to an execution entity of a tenant of a multi-tenant database to provide isolation among the tenants, to provide data integrity, and to facilitate memory granule relinquishment. These memory granules can be divided as needed across execution entities belonging to the same tenant. Memory granules can be migrated between tenants.

Along with the memory granule-level isolation provided for each tenant, the tenant private memory chunks carved out of the shared memory area are mapped to virtual address spaces of the assigned execution entities, as if the memory granule memory chunk were truly private. Each private mapping is made available, on demand, to a single execution entity.

2. Computing Device Overview

Figure 1:
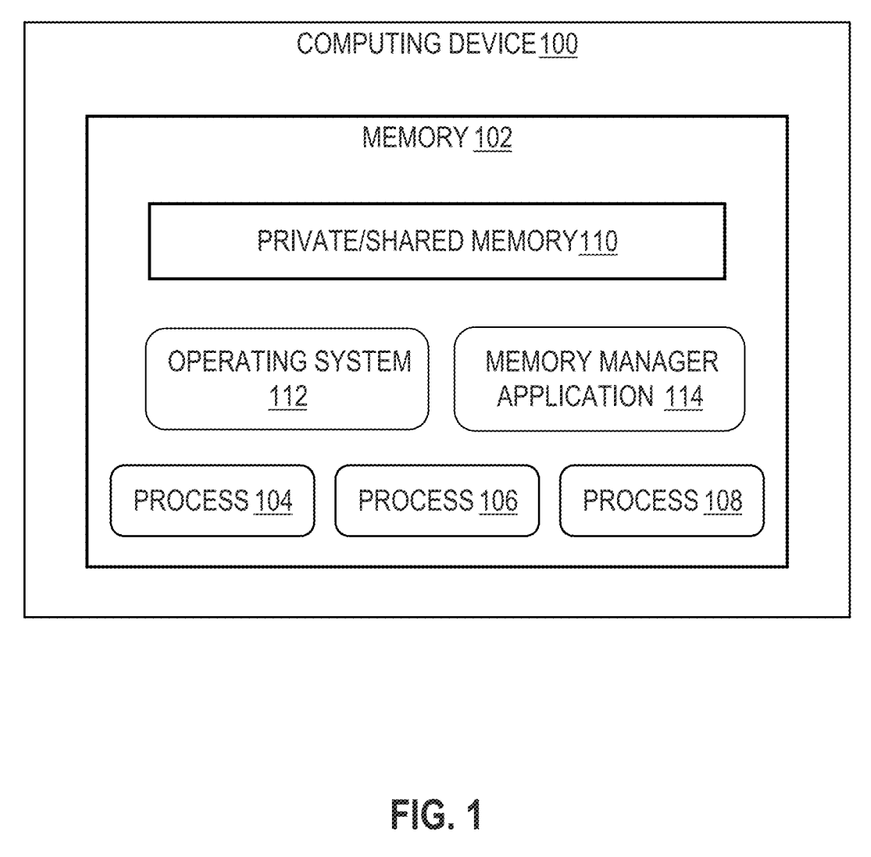
FIG. 1 depicts an example computing device.

FIG. 1 depicts an example computing device 100. Implementations herein are described in the context of an example multi-tenant database management system comprising a database server instance, which is an application, running on computing device 100. However, implementations are not limited thereto. Computing device 100 comprises memory 102 (e.g., DRAM), which includes private/shared memory 110, as described in further detail below. Computing device 100 also runs an operating system (OS) 112, a memory management application 114, and various application processes 104-108, e.g., implementing tasks for various tenants of a multi-tenant database managed by the example multi-tenant management system.

Figure 2:
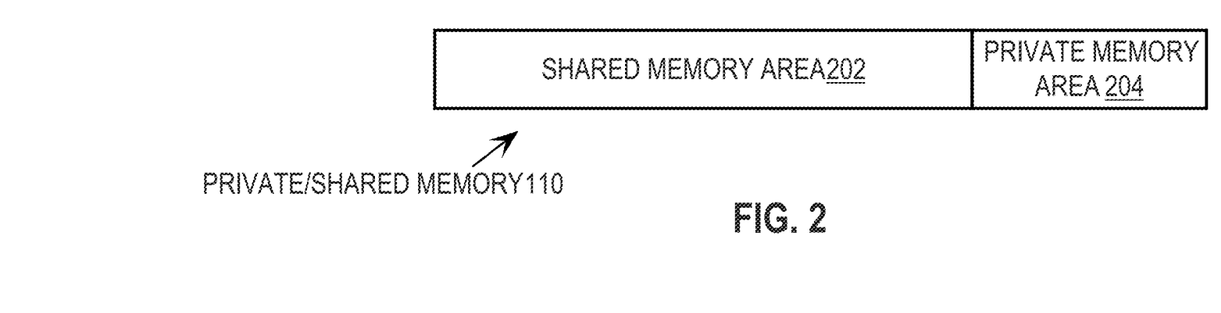
FIG. 2 depicts private/shared memory that comprises a shared memory area and a private memory area.

As depicted in FIG. 2, private/shared memory 110 comprises a shared memory area 202, which includes huge memory pages, and a private memory area 204, which includes standard memory pages. Initialization of computing device 100 comprises identifying the size of shared memory area 202 and the size of private memory area 204, e.g., based on system configuration information.

3. Private Memory Area

According to various implementations, private memory area 204 maintained in memory of computing device 100 comprises a plurality of process private areas (PPAs) that store data and control information (i.e., private data) for individual execution entities, where access to each PPA is exclusive to the owner execution entity. Private memory area 204 represents the total PPA memory allocated for all execution entities of computing device 100.

4. Shared Memory Area

Figure 3:
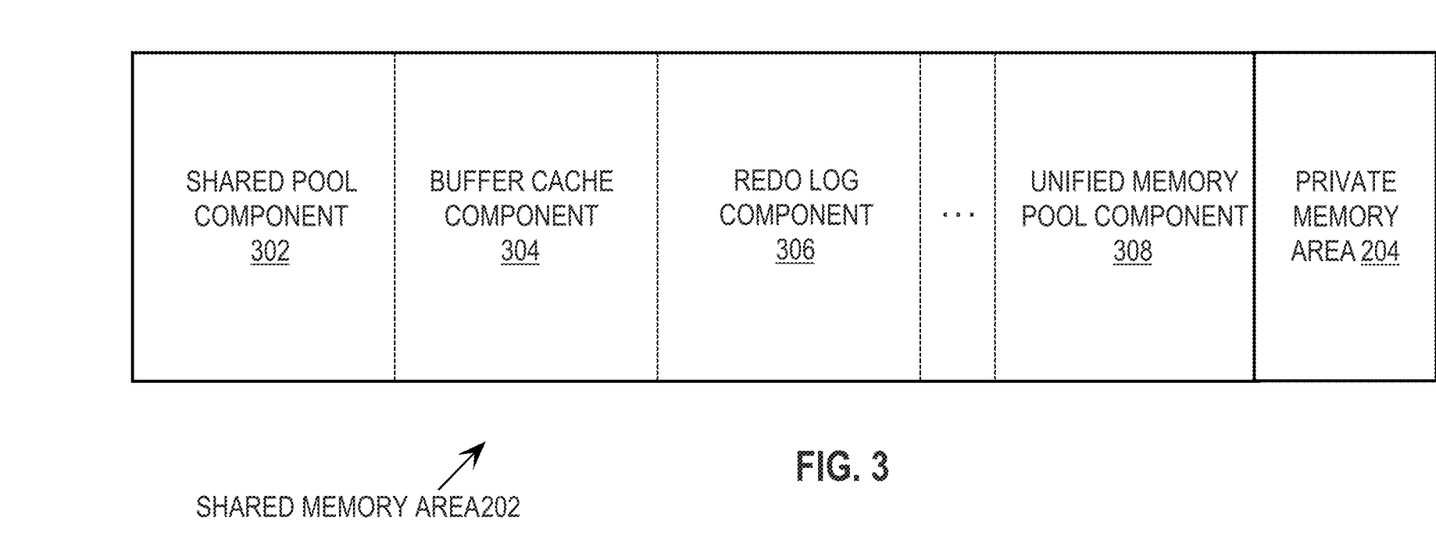
FIG. 3 depicts example memory structures used for shared memory area and private memory areas.

According to various implementations, shared memory area 202 (e.g., a system global area (SGA)) maintained in memory of computing device 100 comprises a plurality of shared memory structures, referred to herein as "components". These components can contain information that is applicable to, and jointly accessible by, multiple application execution entities such as processes 104-108 of computing device 100. FIG. 3 depicts example components in shared memory area 202, including a shared pool component 302 (used to allocate memory for database statement execution), a buffer cache component 304 (used for caching disk blocks), and a redo log component 306 (used to store database redo records). These example components are configured to hold data and control information, for the example multi-tenant database management system, the information being jointly accessible by multiple execution entities on the computing device. Unified memory pool (UMP) component 308, also depicted in FIG. 3, is described in further detail below.

Memory management (MM) application 114 (which may be implemented by the example database management system) manages the sizes of one or more of the components in shared memory area 202. Specifically, MM application 114 allocates and deallocates memory for the components in shared memory area 202 in units of memory granules, where each memory granule comprises one or more huge memory pages. For example, MM application 114 maintains a pool of memory granules that are not allocated to any component in shared memory area 202. When it is determined that a component requires additional memory, MM application 114 assigns a memory granule from the pool of unallocated memory granules to the component, thereby increasing the amount of memory available to the component. When a component no longer requires a particular memory granule, the memory granule is released into the pool of unallocated memory granules. The memory granule size can be scaled based on the amount of memory allocated for shared memory area 202. For example, when the total amount of memory for shared memory area 202 is less than or equal to 1 GB, the memory granule size can be 4 MB (2 huge pages, of 2 MB each), and when the total amount of memory for shared memory area 202 is 1-8 GB, the memory granule size can be 16 MB (8 huge pages, of 2 MB each), etc.

5. Unified Memory Pool Component

Figure 4:
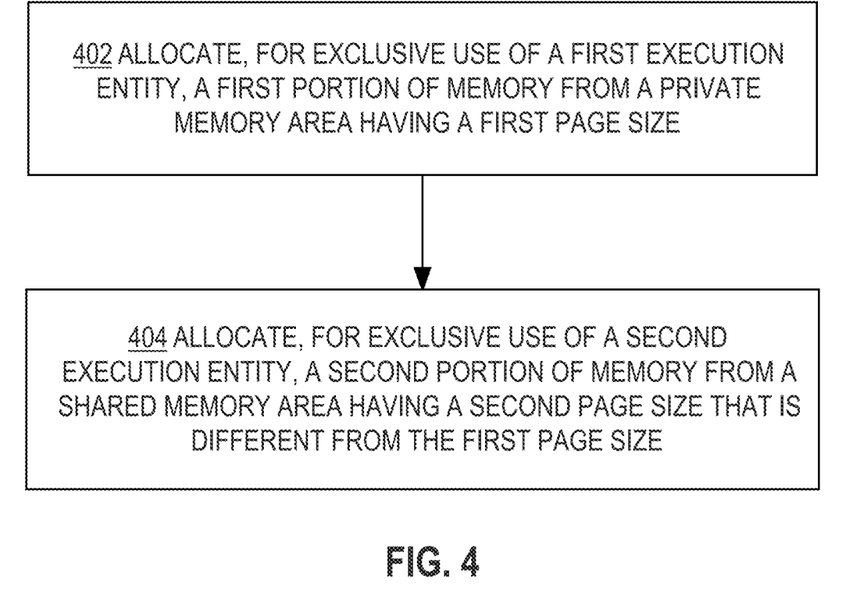
FIG. 4 depicts a flowchart for allocating memory for exclusive use of execution entities from both a shared memory area and a private memory area of a computing device.

According to various implementations, computing device 100 is configured to allocate memory for exclusive use of execution entities of the computing device from both shared memory area 202 and private memory area 204. FIG. 4 depicts a flowchart 400 for allocating memory for exclusive use of execution entities from both a shared memory area and a private memory area of a computing device. Specifically, at step 402, a first portion of memory is allocated, for exclusive use of a first execution entity, from a private memory area having a first page size. For example, process 104 requests private memory space, and in response, MM application 114 allocates one or more standard pages from private memory area 204 for exclusive use of process 104. To illustrate, MM application 114 allocates 16 standard pages, sized 4 KB each, from private memory area 204 for exclusive use of process 104 to provide 64 KB of private memory to the process.

At step 404, a second portion of memory is allocated, for exclusive use of a second execution entity, from a shared memory area having a second page size that is different from the first page size. For example, process 106 requests private memory space, and in response, MM application 114 allocates a portion of a memory granule from UMP component 308 in shared memory area 202 (depicted in FIG. 3) for exclusive use of process 106.

More specifically, UMP component 308 includes one or more granules of memory comprising huge memory pages. UMP component 308 is configured to provide memory chunks of memory granules, the memory chunks being smaller than huge memory pages, to execution entities for exclusive use of the execution entities. Thus, the memory granules of UMP component 308 can be used as private memory without requiring OS 112 to convert huge pages into standard pages. The size of UMP component 308 is dynamic, and as such, MM application 114 is configured to allocate and deallocate memory granules for UMP component 308, as needed. Thus, the amount of memory available for exclusive use of application execution entities in computing system 100 is flexible using UMP component 308 to augment the memory space provided by private memory area 204.

According to various implementations, when an application execution entity requests private memory that is to be supplied from UMP component 308, MM application 114 selects one or more memory chunks from a memory granule allocated to UMP component 308 to satisfy the requirements of the execution entity. The requirements of a given execution entity may include a minimum and maximum size of the requested private memory. According to various implementations, any memory chunks allocated to a particular execution entity are included in an execution entity-specific list of memory chunks, which can be traversed to identify all memory chunks that have been allocated to the particular execution entity.

Figure 5:
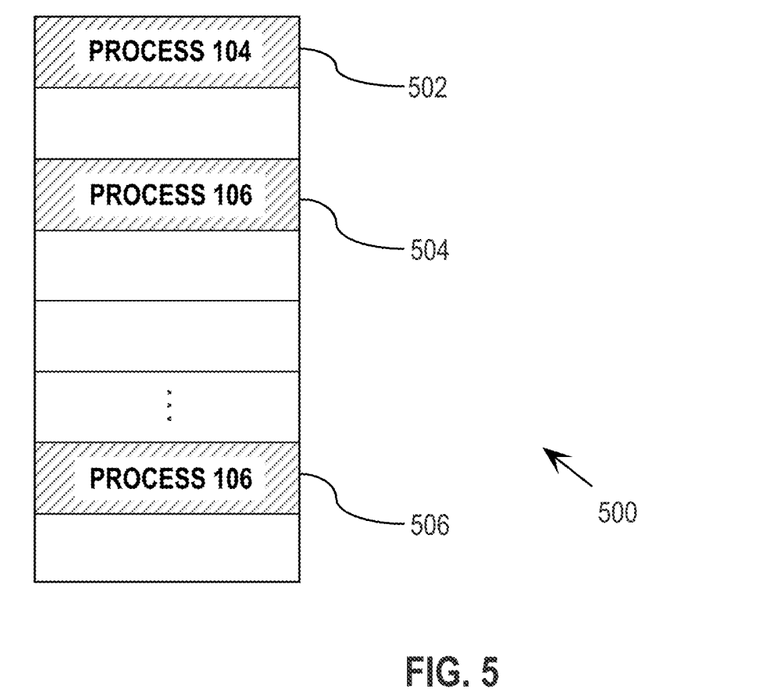
FIG. 5 depicts an example memory granule in a unified memory pool component of a shared memory area.

FIG. 5 depicts an example memory granule 500 in UMP component 308. Example memory granule 500 is 4 MB in size, and two memory chunks of memory granule 500 (i.e., memory chunks 504 and 506) have been allocated for process 106 to store private data. The memory chunks allocated from UMP component 308 may be any size (such as 256 KB), according to implementation. In the case depicted in FIG. 5, two memory chunks were required to satisfy the minimum amount of space requested by process 106. Furthermore, memory chunk 502 of memory granule 500 has been allocated for exclusive use of process 104. The other memory chunks of memory granule 500 (all of which are not depicted in FIG. 5) can be allocated for exclusive use of any application execution entity executing on computing device 100.

According to various implementations, each memory granule in UMP component 308 is associated with a tenant of the example multi-tenant database. Thus, memory chunks from UMP component 308 that are allocated for exclusive use of an execution entity, which is currently performing a task for a given tenant, are allocated from a memory granule that is associated with the tenant.

According to various implementations, multiple memory granules that are associated with a tenant are ordered, and memory chunks from the memory granules are allocated based on the order of the memory granules. In such implementations, a best fit determination to identify one or more memory chunks to satisfy a request for private memory for an execution entity associated with a given tenant is performed within a first memory granule in the ordered list associated with the given tenant. Only if the first memory granule does not include unallocated memory chunks that are sufficient to satisfy the memory request (e.g., based on a minimum size requirement for the request), a best fit determination is performed in a "next" memory granule within the ordered list. Such ordering serves to empty out memory granules that are toward the end of the ordered list of memory granules, which facilitates removing memory granules from the tenant list and potentially releasing the memory granules from UMP component 308 to be used in other shared memory components.

5.1. Unified Memory Pool Component Sizing

According to various implementations, application execution entities provide information to MM application 114 regarding expected private memory requirements. MM application 114 uses that information to size UMP component 308 to accommodate the amount of memory that is expected to be needed for the execution entities. According to various implementations, there is a limit to the amount of memory that the particular execution entities of a tenant can use from UMP component 308 to prevent any one tenant from using an unfair share of the available space in the component.

MM application 114 can track the usage of memory granules allocated to UMP component 308 and adjust the size of the component based on the usage data and service level agreements. A memory granule is used when a memory chunk from the memory granule is allocated for exclusive use of an execution candidate. For example, if a particular memory granule allocated to UMP component 308 has not been used for a threshold amount of time, MM application 114 automatically releases the memory granule from UMP component 308, which causes the memory granule to be (a) unavailable to UMP component 308, and (b) included in a pool of unallocated memory granules maintained by MM application 114. The threshold amount of time can be identified in configuration information for MM application 114.

6. Private Address Management

Though UMP component 308 is part of shared memory area 202, no non-owner application execution entity should have access to any portion of memory in UMP component 308 that has been allocated for the exclusive use of an owner execution entity. Thus, as part of run-time allocation of a chunk of memory from UMP component 308 for exclusive use of an application execution entity, the memory chunk is mapped into a virtual address space of the application execution entity. The virtual address space is used by the execution entity to access the shared and private memory that is available to the execution entity.

A virtual address space is a set of virtual addresses used by an execution entity to identify particular sections of memory, where the virtual addresses do not represent the physical locations of the memory mapped to the virtual address space. Instead, a virtual to physical address mapping, which is not controlled or accessible by application execution entities, is used to translate the virtual addresses in the virtual address space to physical memory locations. Each time an execution entity attempts to access memory using a virtual address, the operating system translates the virtual address to a physical memory location in order to retrieve the data required by the execution entity within the memory. Because the application execution entity does not have access to the physical locations of any memory chunks of memory allocated for the execution entity within UMP component 308, the execution entity is not able to access any non-allocated memory chunks from UMP component 308 given that non-allocated memory chunks are not accessible using the execution entity's virtual address space. Thus, the requirement of isolation between execution entities is met by embodiments described herein.

Figure 6:
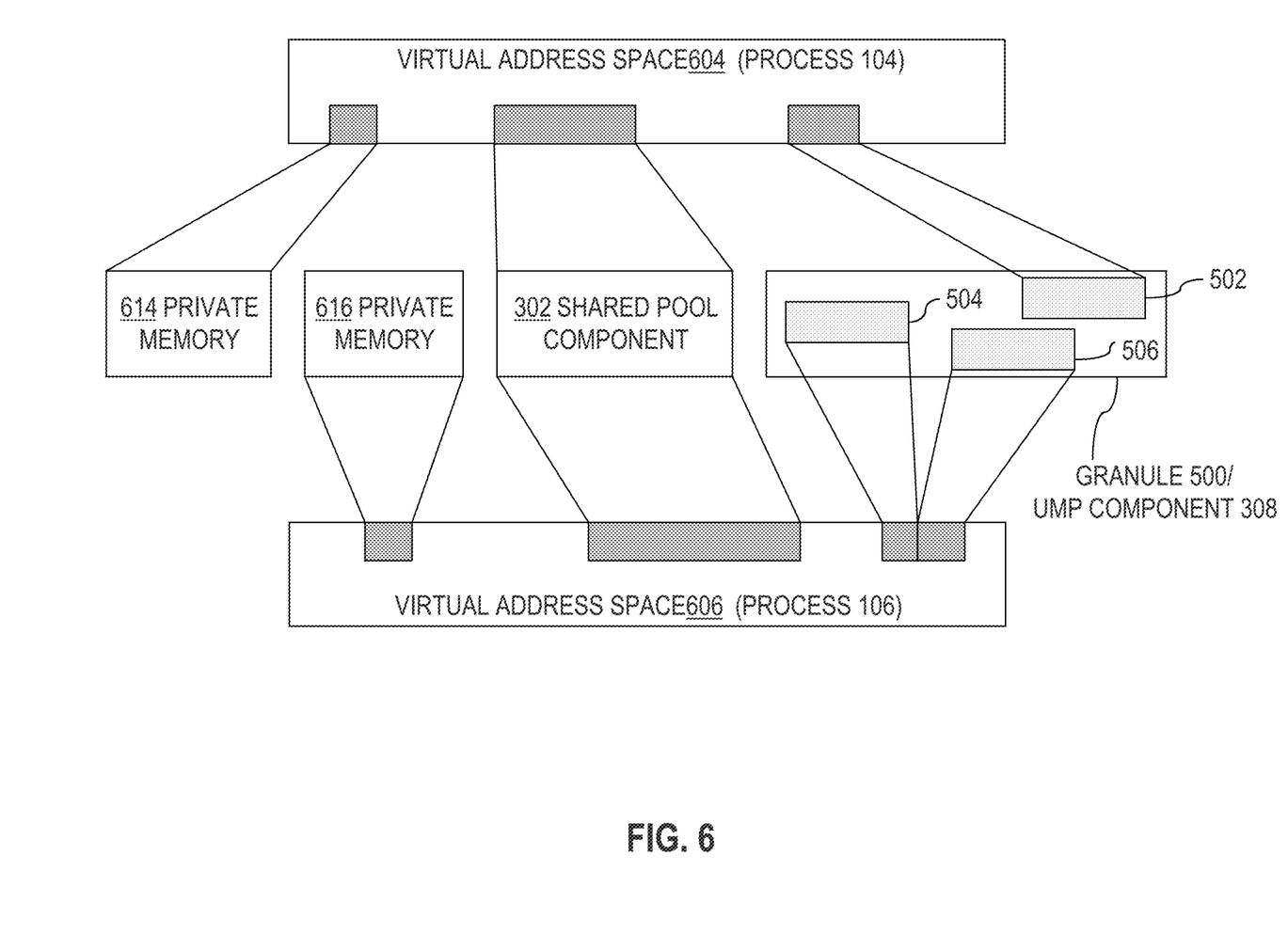
FIG. 6 depicts an example mapping of memory from a private memory area and memory from a shared memory area to multiple execution entities.

To illustrate, FIG. 6 depicts an example mapping of memory from private memory area 204 and memory from shared memory area 202 to processes 104 and 106. Specifically, FIG. 6 depicts a virtual address space 604 maintained for process 104 and a virtual address space 606 maintained for process 106. Virtual address ranges are represented by gray boxes within the private address spaces, and mappings to memory locations are shown by lines connecting the virtual address ranges to example portions of shared memory area 202 (i.e., shared pool component 302 and memory granule 500 from UMP component 308) and private memory area 204 (i.e., private memory portion 614 and private memory portion 616) depicted in FIG. 6. Private memory portion 614 has been allocated for exclusive use of process 104, and as such, has been mapped to virtual addresses in virtual address space 604. Also, private memory portion 616 has been allocated for exclusive use of process 106, and as such, has been mapped to virtual addresses in virtual address space 606. Both process 104 and process 106 have joint access to shared pool component 302, and as such, the memory locations for all of shared pool component 302 are mapped to virtual addresses in virtual address space 604 and in virtual address space 606.

Memory granule 500 includes memory chunk 502 that has been allocated for exclusive use of process 104, and as such, the memory locations of memory chunk 502 are mapped to virtual addresses in virtual address space 604. Memory granule 500 also includes memory chunks 504 and 506, which have been allocated for exclusive use of process 106. As such, the memory locations of memory chunks 504 and 506 are mapped to virtual addresses in virtual address space 606. Because physical memory locations are mapped to virtual addresses, multiple disjoint memory locations can be stitched together by mapping them to contiguous virtual addresses, as is shown by the virtual addresses mapped to memory chunks 504 and 506, which are not contiguous within memory granule 500, within virtual address space 606.

7. Managing Leaks

In response to detecting a release event for an execution entity, MM application 114 releases the memory chunks that are allocated for exclusive use of the execution entity from the execution entity, which causes the memory chunks to be included in a pool of unallocated memory chunks, of UMP component 308, maintained by MM application 114. Example release events for an execution entity include completion of a task by the execution entity, closing of a database session associated with the execution entity, removal of a tenant associated with the execution entity from a multi-tenant database being managed by a database management system on the computing device, and crashing of the execution entity.

According to various implementations, MM application 114 maintains a list of memory chunks of UMP component 308 that have been allocated for the exclusive use of each execution entity. The list of memory chunks associated with an execution entity can be traversed to identify those memory chunks that need to be released to the pool of unallocated memory chunks upon detecting a release event for the execution entity.

Releasing a memory chunk to the pool of unallocated memory chunks can include releasing the mapping of the memory chunk from the virtual address space of the execution entity. A virtual to physical mapping is released when the virtual address is no longer mapped to the physical address within the virtual address space of the execution entity. After the mapping is released, the execution entity is unable to access the previously-allocated chunk of memory. Thus, any dangling or stale pointers that previously referred to the memory chunk cannot be used to corrupt the memory chunk, which may have been reallocated (either to another execution entity as private memory or to another component of the shared memory area).

Also, according to various implementations, at least some execution entities (such as background application execution entities) that serve multiple tenants are not allocated memory from UMP component 308. This prevents such multi-tenant execution entities from being allocated memory within a particular memory granule associated with a first tenant and then using the allocated memory for a task associated with a second tenant. Such cross-tenant utilization of the particular memory granule of UMP component memory could prevent the particular memory granule from being de-allocated, even after the first tenant is no longer part of the multi-tenant database that is being administered.

According to various implementations, MM application 114 maintains lists of execution entities that indicate which sources of private memory should be used for the entities in the lists. For example, execution entities in a first list are not allowed to be allocated memory from UMP component 308. Execution entities in a second list are allocated private memory from private memory area 204, when possible, and from UMP component 308 when not possible. Execution entities in a third list are allocated private memory from UMP component 308 when possible, and from private memory area 204 when not possible.

8. Hardware Overview

An application, such as memory management application 114, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed by any other logical entity that may or may not be depicted in FIG. 3, according to one or more implementations. In some implementations, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
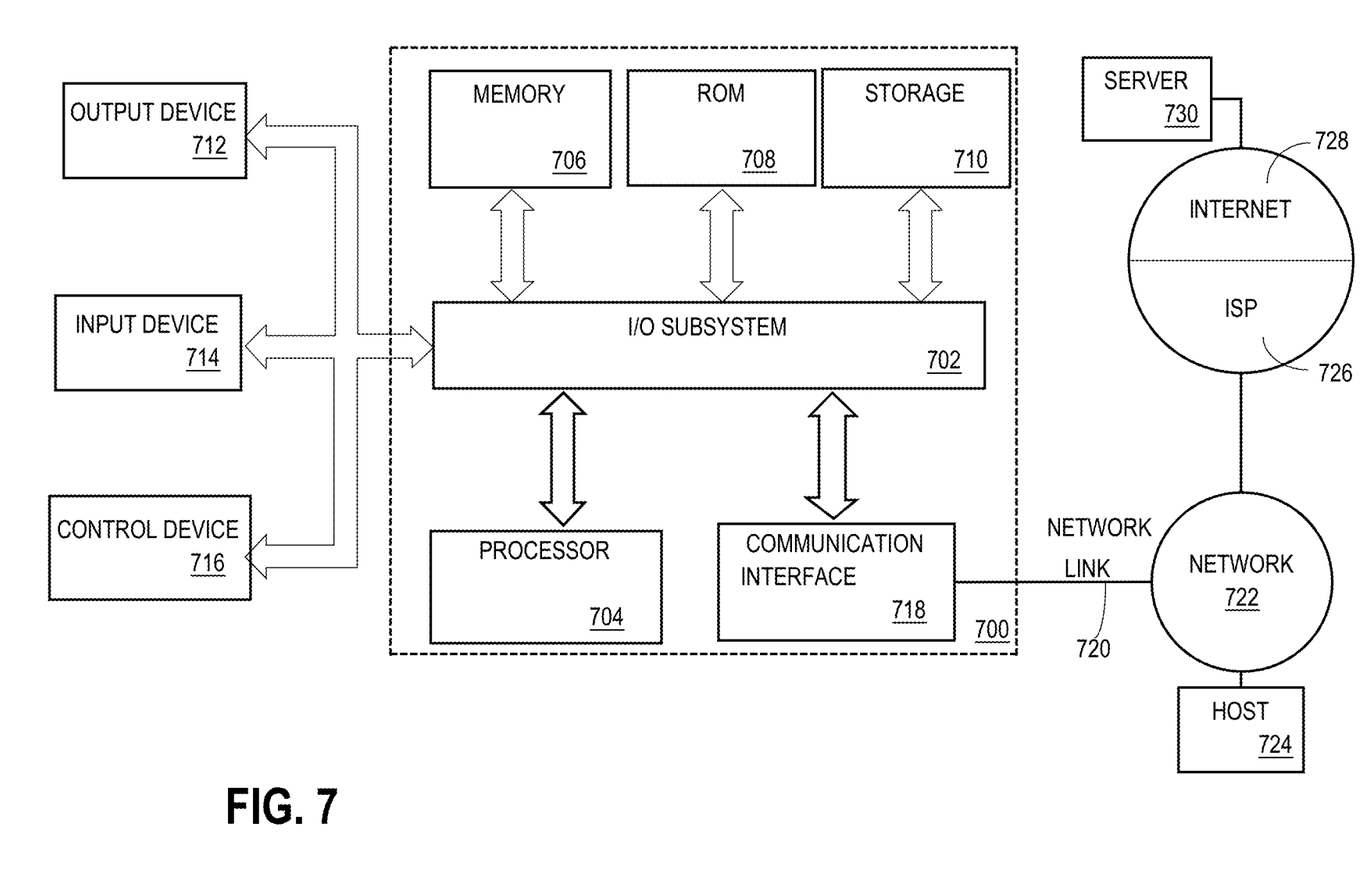
FIG. 7 is a block diagram that illustrates a computer system upon which an implementation may be implemented.

For example, FIG. 7 is a block diagram that illustrates a computer system 700 upon which an implementation of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one implementation, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative implementations, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

9. Software Overview

Figure 8:
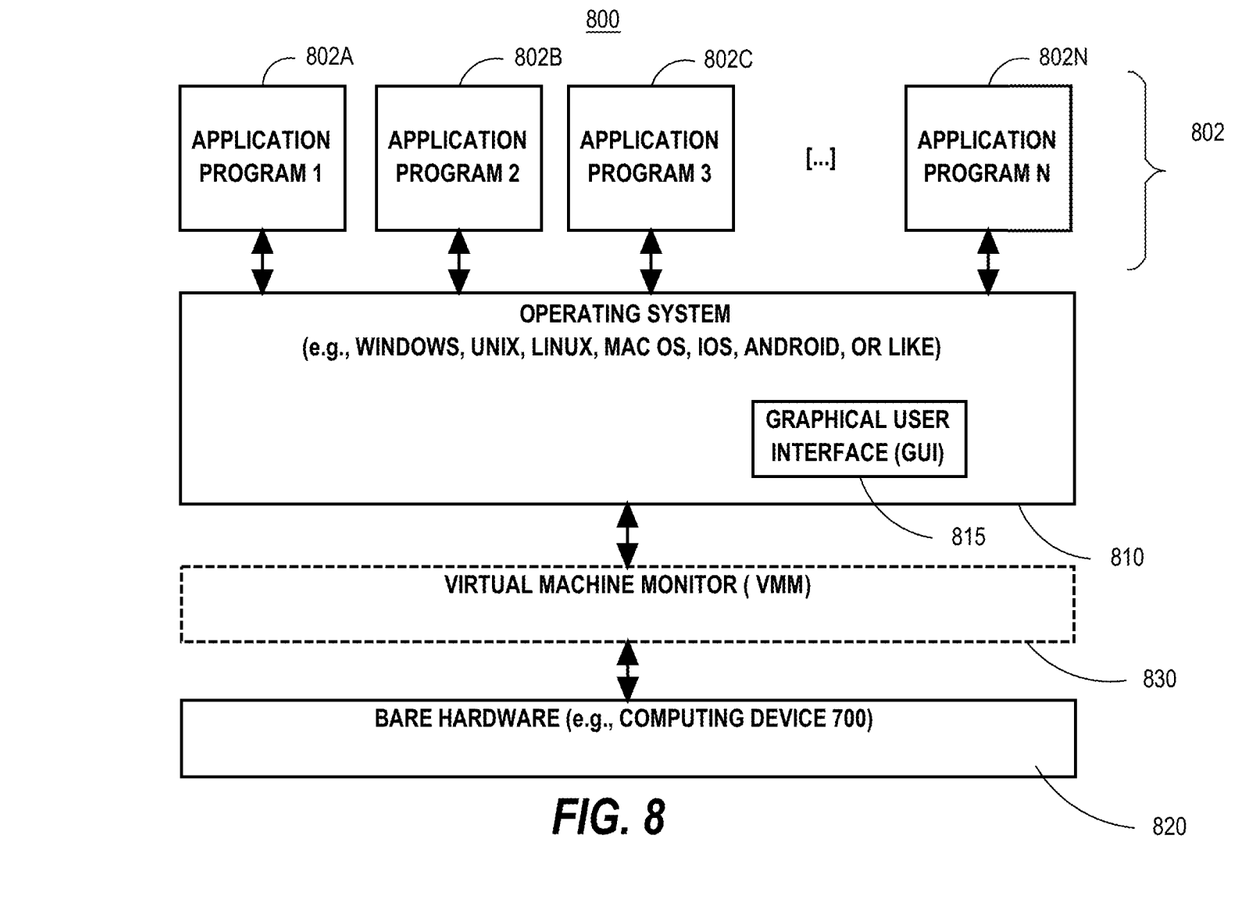
FIG. 8 is a block diagram of a basic software system that may be employed for controlling the operation of a computer system.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example implementation(s). Other software systems suitable for implementing the example implementation(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example implementation(s). The example implementation(s), however, are not necessarily limited to any particular computing environment or computing device configuration. Instead, the example implementation(s) may be implemented in any type of system architecture or processing environment that one skilled in the art, in light of this disclosure, would understand as capable of supporting the features and functions of the example implementation(s) presented herein.

10. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    allocating, for exclusive use of a first execution entity, a first portion of memory from a private memory area having a first page size;
    allocating, for exclusive use of a second execution entity, a second portion of memory from a shared memory area having a second page size that is different from the first page size, wherein:
        the shared memory area comprises a pool of shared memory structures that includes a unified memory pool structure,
        the unified memory pool structure comprises a plurality of memory granules, each memory granule of the plurality of memory granules comprising a plurality of memory chunks,
        the second portion of memory is allocated from the unified memory pool structure and comprises a particular memory chunk in a particular memory granule of the plurality of memory granules;
    determining that the unified memory pool structure requires additional memory; and
    in response to determining that the unified memory pool structure requires additional memory, allocating a memory granule, other than the memory granules of the plurality of memory granules, to the unified memory pool structure,
    wherein the method is performed by one or more computing devices.

2. The computer-executed method of claim 1, further comprising allocating, for exclusive use of the first execution entity, a third portion of memory from the shared memory area.

3. The computer-executed method of claim 1, wherein:
    all allocated memory chunks within the particular memory granule are allocated for exclusive use of execution entities associated with a particular tenant of a plurality of tenants of a multi-tenant database management system; and the second execution entity is associated with the particular tenant.

4. The computer-executed method of claim 3, further comprising:

for each tenant of the plurality of tenants, maintaining an ordered list of memory granules, of the plurality of memory granules, that are associated with said each tenant;

wherein the particular memory granule is included in a particular ordered list of memory granules associated with the particular tenant; and wherein said allocating the second portion of memory from the particular memory granule is based, at least in part, on analyzing the particular ordered list of memory granules in an order indicated by the particular ordered list of memory granules.

5. The computer-executed method of claim 1, further comprising:

determining that a second memory granule, of the plurality of memory granules, has not been used for a threshold amount of time; and in response to determining that the second memory granule has not been used for the threshold amount of time, releasing the second memory granule from the unified memory pool structure.

6. The computer-executed method of claim 1, wherein:

said allocating the second portion for exclusive use of the second execution entity comprises mapping memory locations of the second portion of memory to a virtual address space for the second execution entity;

the method further comprises, after allocating the second portion for exclusive use of the second execution entity, releasing the second portion of memory from the second execution entity comprising removing a mapping of the second portion of memory from the virtual address space for the second execution entity.

7. One or more non-transitory computer readable media storing one or more sequences of instructions that, when executed by one or more processors, cause:

allocating, for exclusive use of a first execution entity, a first portion of memory from a private memory area having a first page size;

allocating, for exclusive use of a second execution entity, a second portion of memory from a shared memory area having a second page size that is different from the first page size, wherein:

the shared memory area comprises a pool of shared memory structures that includes a unified memory pool structure, the unified memory pool structure comprises a plurality of memory granules, each memory granule of the plurality of memory granules comprising a plurality of memory chunks, the second portion of memory is allocated from the unified memory pool structure and comprises a particular memory chunk in a particular memory granule of the plurality of memory granules;

determining that the unified memory pool structure requires additional memory; and in response to determining that the unified memory pool structure requires additional memory, allocating a memory granule, other than the memory granules of the plurality of memory granules, to the unified memory pool structure.

8. The one or more non-transitory computer readable media of claim 7, wherein the one or more sequences of instructions further comprise instructions that, when executed by one or more processors, cause allocating, for exclusive use of the first execution entity, a third portion of memory from the shared memory area.

9. The one or more non-transitory computer readable media of claim 7, wherein:

all allocated memory chunks within the particular memory granule are allocated for exclusive use of execution entities associated with a particular tenant of a plurality of tenants of a multi-tenant database management system; and the second execution entity is associated with the particular tenant.

10. The one or more non-transitory computer readable media of claim 9, wherein the one or more sequences of instructions further comprise instructions that, when executed by one or more processors, cause:

for each tenant of the plurality of tenants, maintaining an ordered list of memory granules, of the plurality of memory granules, that are associated with said each tenant;

wherein the particular memory granule is included in a particular ordered list of memory granules associated with the particular tenant; and wherein said allocating the second portion of memory from the particular memory granule is based, at least in part, on analyzing the particular ordered list of memory granules in an order indicated by the particular ordered list of memory granules.

11. The one or more non-transitory computer readable media of claim 7, wherein the one or more sequences of instructions further comprise instructions that, when executed by one or more processors, cause:

determining that a second memory granule, of the plurality of memory granules, has not been used for a threshold amount of time; and in response to determining that the second memory granule has not been used for the threshold amount of time, releasing the second memory granule from the unified memory pool structure.

12. The one or more non-transitory computer readable media of claim 7, wherein:

said allocating the second portion for exclusive use of the second execution entity comprises mapping memory locations of the second portion of memory to a virtual address space for the second execution entity;

the one or more sequences of instructions further comprise instructions that, when executed by one or more processors, cause, after allocating the second portion for exclusive use of the second execution entity, releasing the second portion of memory from the second execution entity comprising removing a mapping of the second portion of memory from the virtual address space for the second execution entity.

* * * * *